March 25, 1958 W. JACKSON, JR 2,828,479
METHOD AND APPARATUS FOR OPERATING A PIPE
TRANSMISSION LINE
Filed Nov. 19, 1952

INVENTOR.
WARREN JACKSON JR.
BY
Campbell, Brumbaugh, Free & Graves
ATTORNEYS

2,828,479

METHOD AND APPARATUS FOR OPERATING A PIPE TRANSMISSION LINE

Warren Jackson, Jr., East Cleveland, Ohio, assignor to The Standard Oil Company, Cleveland, Ohio, a corporation of Ohio Application November 19, 1952, Serial No. 321,320

9 Claims. (Cl. 340—239)

This invention relates to detecting devices, and more particularly to devices responsive to change in the characteristics of surrounding fluid media. More specifically, the invention is concerned with both a method and mechanism for detecting the presence, or determining the position of the interface between adjoining bodies of different fluids.

This application is a continuation in part of the copending application Serial No. 137,929, filed January 11, 1950, now abandoned.

It is now common practice to transport liquids such as petroleum products, for example, long distances through pipe lines. Usually, so-called "slugs" of different products are pumped in succession through the pipe line, a slug of one product immediately succeeding a slug of another without any break. Some difficulty has been encountered, heretofore, in identifying the end of one slug and the beginning of another.

In a typical system, for example, the interface between two adjacent slugs of different materials is located by timing the flow from the originating station, and computing the distance travelled by the interface in a given time, the rate of flow being fairly accurately known. While this method is effective in some cases, it is indirect, and if color changes cannot be used as an indication of the interface, as where like appearing fluids such as gasoline and kerosene, for example, follow one another in the line, the method cannot be checked. An error in calculating the time, therefore, might result in the inadvertent mixing of a relatively large quantity of one of the materials with the other.

It is an object of this invention, accordingly, to provide a system for detecting the presence of an interface between different fluids, which is operable, for example, in the absence of perceptible color differences in the fluids.

It is another object of the invention to provide a device responsive to changes in the characteristics of surrounding fluid media which eliminates the need of a vigilant observer and which is adapted to provide signals at a point remote from the point of detection.

Another object of the invention is to provide a detecting system for pipe line flows which may be readily installed in a pipe without jeopardizing the strength thereof or exposing the fluid flowing therein to light from an external source.

Another object of the invention is the provision of a detecting system which is operable over a relatively large length of a conducting pipe and which, consequently, enables the detection of interfaces between pipe line slugs where considerable intermixing occurs in the vicinity of the interface.

Another object of the invention is to provide a detecting system for fluid interfaces which is susceptible of operation using an A. C. power source.

Still another object of the invention is to provide an improved detecting system for fluid interfaces including integrated warning and recording means.

The invention is based on the discovery that if a thermistor or similar device having a high resistance-temperature coefficient is immersed in a liquid and is supplied with electrical energy at a given rate, its temperature, and therefore its resistance, is a function of the nature of the liquid in which it is immersed. According to the invention, at least one thermistor or like device is positioned so as to be enveloped sequentially by at least two fluids having an interface therebetween and at substantially the same temperature, and electrical energy is supplied to the thermistor at a rate sufficient to maintain its temperature preferably normally above the temperature of the two fluids. While the thermistor is enveloped by one of the fluids, its temperature and, therefore, its resistance will remain substantially constant, provided, of course, that the temperature of the fluid is constant and its rate of flow is either zero or constant. When the interface passes the thermistor and the latter is enveloped by the other fluid, a change in heat dissipation takes place, causing both the temperature and the resistance of the thermistor to change. The change in resistance is an indication that the interface has passed the thermistor.

Preferably at least two thermistors are positioned in a pipe line accommodating a seriate flow of different fluids, for example, so as to be enveloped sequentially by the fluids, and they may be connected in the arms of a bridge circuit in such fashion as to render the system essentially non-responsive to similar changes in the temperature of both fluids or in the rate of flow of the fluids past the thermistors. With this construction the ratio between the resistances of the thermistors will change when a different fluid envelopes the leading thermistor, thereby indicating that an interface between two fluids is disposed between the two thermistors.

If desired, a first pair of thermistors may be widely spaced in the pipe line to provide a preliminary or warning signal, with a second pair of thermistors being provided within the first two to provide a final or controlling signal.

For convenience the system may be energized from an A. C. source and may be utilized in situations in which the spacing of the two thermistors is relatively great so as to require the use of a transmission line to convey the signals from at least one of the thermistors to a control or signalling point. In such cases it has been found that a balancing capacitor may be connected across the leads to the nearer of the two thermistors so as to balance the capacitance of the transmission line. Moreover, a variety of warning and recording devices may be embodied in the system, the former being operated through relay means so as to be operable when the bridge circuit becomes unbalanced in either direction.

The invention may be better understood by reference to the following detailed description of a specific embodiment thereof, taken in conjunction with the accompanying drawings, in which.

Figure 1:
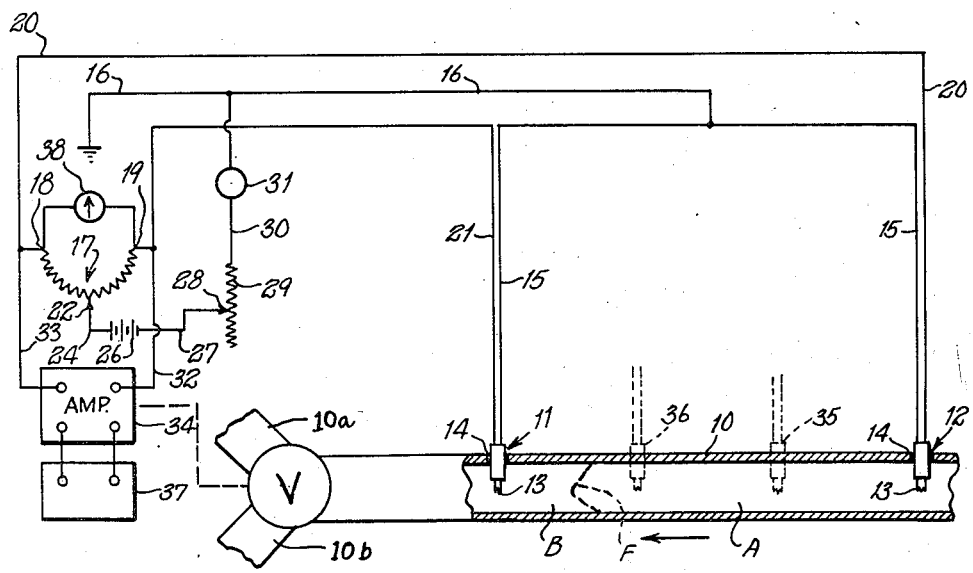
Figure 1 is a schematic diagram of a typical circuit formed according to the invention for detecting the interface between pipe line slugs of different materials.

Referring first to the diagram of Figure 1, there is shown a section of a pipe line 10 through which different fluid products may be successively passed. Contiguous portions of two different fluids A and B form an interface F which may be either clearly delineated, or indistinct over a short distance within the pipe, indicating mixing of the adjoining fluids. The fluid products passing through the pipe line 10 can be directed selectively into pipe lines 10a and 10b by diverting means such as a valve V, for example, the interface first having been detected, all in accordance with the present invention.

In one form of the invention, a pair of temperature sensitive resistors in the form of conventional thermistor units 11 and 12 may be utilized in a novel manner to detect the presence of the interface F. The thermistor units comprise mounted pieces of sintered metal oxide 13 which have high negative temperature coefficients of electrical resistance, of the order of —0.04 ohm/ohm/° C., for example.

In the circuit selected for illustration, the thermistor units 11 and 12 are mounted in the pipe line 10 in spaced relationship along the line of flow, each thermistor unit preferably being secured in the pipe wall by means of a threaded ferrule 14. The resistor elements 13 of the respective thermistor units are suspended within the pipe so as to be enveloped by the fluid flowing therethrough. Each resistor element 13 is provided with suitable electrode means having terminals or leads in the outer end of the unit in which it is mounted. One terminal of each of the thermistor units 11 and 12 is connected to ground by means of a circuit including conductors 15 and 16. Alternatively they may be grounded at the pipe.

A resistor 17, having end terminals 18 and 19, is connected across the ungrounded terminals of the thermistors 11 and 12, the terminal 18 being connected by a conductor 20 to the ungrounded terminal of the thermistor 12 and the terminal 19 being connected by a conductor 21 to the ungrounded terminal of the thermistor 11.

The resistor 17 is divided by a slide contact or adjustable tap 22 connected by a conductor 24 to one terminal of a suitable source of electrical energy such as a battery 26, for example, the other terminal of which is connected to ground through a circuit including a conductor 27, a slide contact 28 engaging a resistor 29, a conductor 30, a milliammeter 31, and the conductor 16. Obviously, A. C. may be used instead of D. C., if desired.

It will be seen that the thermistors 11 and 12, together with the two halves of the divided resistor 17, form a conventional Wheatstone bridge circuit having as its junctions or null points the terminals 18 and 19 of the resistor 17, and energized by the battery 26. The balance point may be determined by observing the reading of a suitable microammeter or galvanometer 38 connected to the terminals 18 and 19 as a bridge diagonal.

A flow of current, regulated by the current-limiting resistor 29, and measured by milliammeter 31, is passed through the two legs of the bridge which may be brought into balance by adjustment of the slide contact 22 on the resistor 17 to provide null points at the terminals 18 and 19. Preferably, the resistor 29 should be adjusted to cause sufficient current to flow through the thermistors 11 and 12 to bring the temperatures of the resistor elements 13 somewhat above the temperature of the fluid being transported by the pipe line 10.

The operation of the device of Figure 1 is as follows:

With a given fluid A flowing through the pipe line 10 and engulfing the resistor elements 13 of both of the thermistor units 11 and 12, the heat dissipated from the elements will be essentially constant so that a given resistance ratio between the two resistors 13 will obtain. The Wheatstone bridge circuit is then balanced by means of the slide contact 22 to provide null points at the terminals 18 and 19 of the bridge as described. When the element 13 of the thermistor 12 is enveloped by the second fluid B, which may be at the same temperature and flowing at the same velocity as the fluid A, the rate of heat dissipation from the thermistor 12 will change so that both the temperature and the resistance of resistor element 13 in the thermistor unit 12 will change. The bridge will, consequently, become momentarily unbalanced causing a voltage to be developed across the null points 18 and 19 indicating that the interface F lies between the respective thermistor units 11 and 12. The bridge will remain unbalanced until the interface F has passed the thermistor 11 at which time both it and the thermistor 12 will be enveloped by the fluid B. Under these conditions, the rates of heat dissipation from the thermistors 11 and 12 will be such as to restore the bridge to its initial balanced condition.

The potential or change in potential, developed across the bridge may be fed through the conductors 32 and 33 to an amplifier 34, the output of which may in turn be fed to a suitable means 37 such for example as a signal light, alarm, automatic valve control system for the valve V, recorder, or other means. When the signal output from the amplifier 34 exceeds a given value, a lamp may be lighted, or a relay may be energized to sound an alarm or to operate control apparatus or the like.

If desired, a second Wheatstone bridge circuit, including thermistors 35 and 36 may be utilized to provide a second signal to define more closely the position of the interface. In this case, the thermistors should be closely spaced along the line of flow within the thermistors 11 and 12. A second bridge circuit (not shown) identical with the above described circuit, may be provided to produce the required signals. The first circuit might then be utilized to provide a warning signal and the second a control signal. Or, if desired, the two circuits may be used to determine the velocity of the interface through the pipe, the velocity being a function of the time difference between the corresponding signals from each circuit.

The theory underlying the operation of the system is not yet fully understood. However, it is supposed that the change in the resistance value of the thermistor is due to a change in its temperature resulting from a change in the amount of heat dissipated or in the rate of heat dissipation from the thermistor when the enveloping liquid is changed. In other words, the resistance change observed is believed to be a function of the relative heat conductivities of the two fluids separated by the interface.

In preliminary tests that were made, a number of liquid hydrocarbon samples were placed in similar bottles in a temperature bath held to 25° C.±0.1° C. Two thermistor elements connected in a Wheatstone bridge circuit as in the figure were first immersed, respectively, in two bottles both containing n-heptane and the bridge was brought into balance by adjustment of the sliding contact until the microammeter 38 read zero. One of the thermistor elements was then immersed successively in bottles containing different liquids and the reading of the microammeter 38 for each combination of liquids was recorded. The results are summarized in the following table:

*Table I*

| Fluid | Galvanometer Unbalance in Microamperes |
|---|---|
| n-Heptane (Reference) | 0 |
| N-Octane | 6 |
| Benzine | —13 |
| Iso-octane | 82 |
| Tap water |《—200 |
| Acid treated Lubricating Oil of 300 Seconds Viscosity at 100° F. (SUS) | 》200 |
| Absolute Methanol | —104 |
| Straight Run Naphtha | 40–49 |
| Kerosene | 123–135 |
| #1 Furnace Oil | 137 |
| #3 Furnace Oil 40% #1 60% Light Catalytic Gas Oil | 160–170 |
| Distillation Cuts of Straight Run Naphtha | (P-3-1) |
| Cut #1, 94°–169° F. boiling | 4–7 |
| Cut #2, 169°–187° F. boiling | 23 |
| Cut #3, 187°–205° F. boiling | 28 |
| Cut #4, 205°–234° F. boiling | 46 |
| Cut #5, 234°–292° F. boiling | 50 |
| CCl₄ | 79 |
| Cetane | 95 |

The relationship between the above readings and the various classified properties of the fluids, such as viscosity, specific heat, coefficient of expansion and molecular weight is not consistent, with the possible exception of molecular weight, in which case the relationship is consistent with each of the listed fluids except the isomers. Iso-octane and normal octane, for example, have identical molecular weight but gave widely different readings on the milliammeter. While the above experimental information is offered by way of explaining what is known of the theory of operation of this invention, it should not be construed as prejudicial to or limiting in any way the scope of the invention as defined in the claims.

In another test simulating conditions in an actual pipe line, adjacent slugs of straight run naphtha and kerosene at the same temperature were caused to flow through a transparent conduit provided with two thermistors in a Wheatstone bridge circuit as shown in Figure 1 of the accompanying drawing. The bridge was balanced while both thermistors were enveloped by the naphtha and the latter was dyed red so that visual observation of the position of the interface could be made. While the naphtha was flowing past the two thermistors the reading of the microammeter 38 was observed to fluctuate about ±20 microamperes, perhaps as a result of turbulence in the flow or slight temperature variations.

When the interface between the two liquids passed the first thermistor, the microammeter 38 deflected more than 100 microamperes or over five times the random fluctuations previously observed. This deflection was observed a number of times with the flow in both directions and with the dye first in one component and then in another. After the interface passed the second thermistor, both thermistors were again in the same medium and the microammeter deflection returned to small fluctuations about the original balance point.

In practice, straight run naphtha and kerosene, products which cannot readily be distinguished by color, are quite apt to follow one another in a commercial petroleum pipe line. It will be apparent from the foregoing test data that the interface between slugs of these two products can be readily located by means according to the invention.

Figure 2:
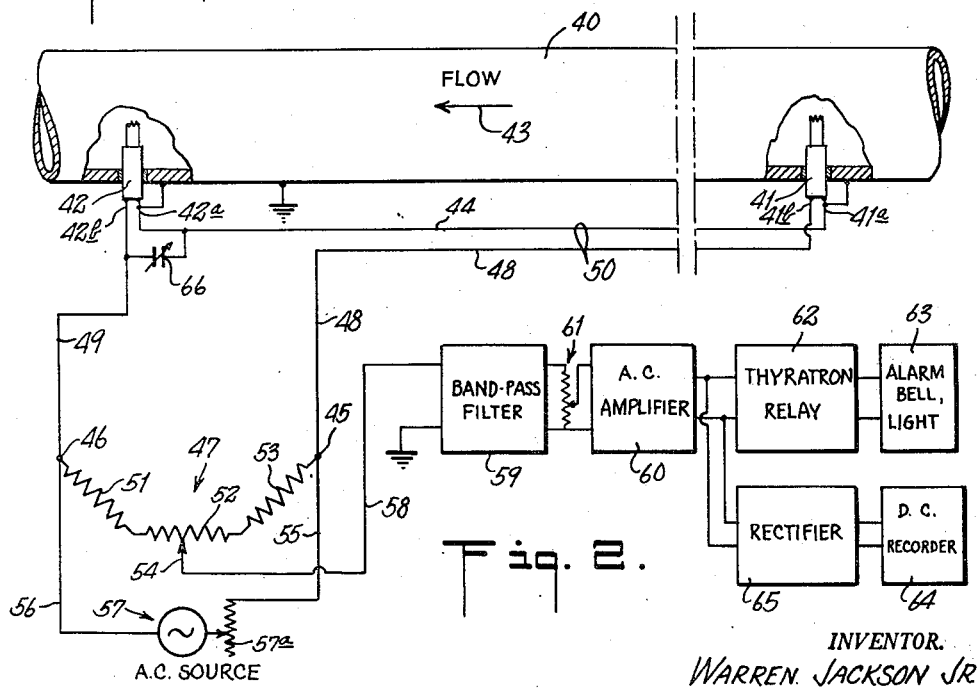
Figure 2 is a schematic diagram of a modified detecting system embodying detecting, warning and recording means.

Referring now to Figure 2 there is shown a detecting system which is particularly adapted for field installation in situations in which the interface between the two fluids flowing in a conduit extends over a relatively long length ranging from say two hundred feet to two miles. The numeral 40 designates a section of pipe line through which fluid products may be successfully passed. Disposed at widely spaced points along the length of the pipe line are temperature sensitive impedance elements which can be in the form of thermistors 41 and 42, the spacing exceeding the distance over which the two fluids are apt to mix.

In the system illustrated in Figure 2 it will be assumed that the flow through the pipe line 40 is in the direction of the arrow 43 and that the indicating and control mechanism responsive to the thermistors and described below is disposed in the vicinity of the second thermistor 42. Terminals 41a and 42a of the respective thermistors 41 and 42 are connected to the pipe line 40 as a ground and are also tied together by means of a grounded electrical conductor 44. Terminals 41b and 42b of the thermistors are respectively connected to terminals 45 and 46 at opposite ends of an impedance network 47, by means of electrical conductors 48 and 49, respectively. The conductors 44 and 48, which are connected to the thermistor 41 can be comprised in part of a transmission line in the form of a telephone wire 50 strung on poles, for example, between the thermistors.

It will be seen that the impedance network 47, which can comprise an impedance element 51, a potentiometer 52 and an impedance element 53 all connected in series, forms in cooperation with the two thermistor elements a bridge network having the terminals 45 and 46 as two of its junctions. The other two junctions comprise the grounded pipe line 40 between the thermistors and a slide-tap 54 of the potentiometer 52. Connected as a bridge diagonal across the junctions 45 and 46 by means of the electrical conductors 55 and 56 is a source of electrical power which can comprise an A. C. source indicated generally by the numeral 57 and described more fully below.

An output circuit is connected as a second bridge diagonal across the bridge network between the ground connection and the slide-tap 54 of the potentiometer 52. Connected to the slide-tap 54 of the potentiometer 52 by means of an electrical conductor 58 is a filter 59 of the narrow band-pass type for passing frequencies in the range of the power source 57. The output of the band-pass filter 59 is connected to an A. C. amplifier 60, which can be a conventional resistance coupled amplifier for example, through a potentiometer 61 comprising a sensitivity control for the system. The output of the amplifier 60 is connected to a relay means 62 which can comprise, for example, a conventional thyratron relay responsive to both negative and positive pulses, and the output of which is connected to a suitable alarm 63 including a bell or light, or both.

In addition, a recorder 64 can be connected through to provide a permanent and continuous record. As described in greater detail below an operator watching the shape of the recorder curve will be able to ascertain quite accurately the location and magnitude of an interface between the thermistors and in a preferred arrangement, the alarm 63 will be arranged to respond to relatively small signals, say 20 percent of full scale on the recorder, to warn the operator of the approaching interface.

As stated, the power source 57 utilized in this system is A. C. thereby enabling the use of relatively stable A. C. amplifiers in the system. In accordance with the invention, the A. C. source 57 can be selected to have a frequency value differing from that of the local power mains. Thus, for example, if 60 cycle power is available, the source 57 may be selected, for convenience, to provide a 120 cycle signal using a frequency doubling circuit. The band-pass filter 59 will then be selected to pass only frequencies in the vicinity of 120 cycles, so that any 60 cycle signal which might be induced in the telephone wire 50, for example, will be filtered out.

Because the transmission line 50 extends over a long distance relatively to the distance between the second thermistor 42 and the bridge network, a variable balancing condenser 66, connected between the terminals 42a and 42b of the thermistor 42, can be used to balance out the difference in capacity of the transmission line 50 and that of the line from the second thermistor 42 to the bridge network, the latter distance in most cases being in the vicinity of say 50 to 200 feet. In a preferred arrangement for the system, the second thermistor 42 and the several control and indicating devices will be located in a shelter, such as a valve house along the pipe line, and the first thermistor 41 will be located up to two miles up the pipe line. From the valve house an operator will be able to learn the location and approximate length of the interface, and to a certain degree the velocity of flow in the pipe line if such is not known. He will, therefore, be able to separate the fluids from each other and, if desired, separate from either or both fluids the mixture of fluids in the vicinity of the interface.

In operation, assuming one fluid is enveloping both thermistors, the voltage of the A. C. source will be adjusted, by means of the variable resistor 57a for example, to establish a flow of current through the thermistors which will heat them to a temperature exceeding that of the fluid in the pipe line. The relay and alarm 62 and 63 respectively will be adjusted so that the light or bell or both are just short of actuation. The slide-tap 54 of the potentiometer 52 will also be adjusted to achieve a null point between the slide-tap and ground, that is, the slide-tap may be adjusted until ground potential is found in the fixed impedance network 47. If desired, a voltage difference other than zero between ground and the slide-tap may be used as a reference voltage. When an interface appears between the two thermistors so that different fluids of the same temperature and moving at the same velocity envelope the respective thermistors, the bridge will become unbalanced due to the change in the rate of heat dissipation in the vicinity of the thermistor 41, and a voltage or a different voltage, as the case may be, will appear across the bridge diagonal. This voltage will first actuate the sensitive alarm 63 to warn the operator to watch the recorder 64, which will then read about 20 percent of full scale. By watching the recorder curve, the operator can determine the location of the interface. A relatively high reading, which by previous adjustment will be in the vicinity of full scale, will indicate the presence of the entire interface between the thermistors and a return of the reading to near zero will indicate the interface has passed the second thermistor. Intermediate readings on the recorder curve will indicate mixing zones. Using this information the operator will be able to separate the fluids by appropriate manipulation of the valves.

It is apparent that certain modifications of the circuit can be provided in accordance with the invention. For example, the bridge network can be connected without grounding the junction between the thermistors. Also, a system using a single thermistor may be set up by providing a fixed resistor or impedance element in place of the second thermistor, with a bridge circuit as described or other suitably sensitive means being provided for detecting a change in the resistance or impedance value of the single thermistor as a consequence of a change of the enveloping fluid.

It will be desired in many cases to use pipe scrapers in the lines in which the detecting systems are used, in which cases it has been found that the thermistors may be mounted in recessed areas in the pipe lines.

In the foregoing specification illustrating preferred embodiments of the invention, systems have been disclosed using D. C. and A. C. as the respective energizing sources. In one case the bridge circuit has been described as a resistance bridge and in the other as an impedance bridge. For purposes of definition in the following claims, the word impedance is used, in accordance with accepted practices, as being generic to both resistance and impedance.

From the foregoing it will be apparent that the invention provides a detecting system utilizing thermistors or other similar commercially available products in a novel manner to determine characteristics of pipe line flows. It will be further apparent that the several embodiments described by way of illustration may be widely modified within the purview of the invention and the embodiments described, therefore, are not to be regarded as limiting in any way the scope of the following claims.

I claim:

1. In a system for effecting the operation of a pipe transmission line by detecting the presence of interfaces between liquids flowing serially in a pipe line and for separating the respective liquids, the combination of a pipe transmission line for flowing liquids, valve means in the pipe line to separate the liquids, at least two temperature sensitive impedance elements mounted to be enveloped by the liquid flowing in the pipe line at points spaced along the length thereof, said pipe line between and at least immediately before the elements being subjected to the same ambient temperature conditions, a source of electrical power connected to said elements to cause an electric current to pass therethrough to raise the temperature of each to a value exceeding that of the liquid in the pipe line, control means to adjust the relative current flow in the two elements to achieve a given impedance ratio for the elements, and indicator means in accordance with which said valve means can be operated responsive to change of the impedance ratio of said elements as indicative of the passing of an interface between two different liquids past either of the sensing elements.

2. Apparatus as set forth in claim 1, including means to connect said temperature sensitive impedance elements in an impedance bridge as arms thereof, means to connect said indicator means as a bridge diagonal and means to connect said electrical power source as another bridge diagonal.

3. Apparatus as set forth in claim 1, said control means to adjust the relative current flow in said temperature-sensitive elements including a first control member to regulate the total current flow from the source to both of the temperature sensitive impedance elements, and a second control member to divide the current between the two elements in a selected ratio.

4. Apparatus as set forth in claim 1, said control means to adjust the relative current flow in said temperature-sensitive impedance elements including a first control member to regulate the total current flow from the source to both of the temperature-sensitive elements, and a second control member to divide the current between the two elements in a selected ratio, said second control element comprising adjustable impedance means, and means to connect the adjustable impedance means in an impedance bridge together with said temperature-sensitive impedance elements.

5. Apparatus as set forth in claim 1, said indicator means including recording means to provide a continuous record of the signals developed across the bridge diagonal and alarm means to afford an output in response to signals developed across the bridge diagonal, said alarm means being responsive to signals of lesser magnitude than the maximum signal which can be recorded by said recording means.

6. In a method of operating a pipe transmission line through which a plurality of different liquids of substantially the same temperature are transported serially at a constant velocity to divert from the line at a point remote from the beginning thereof preselected liquids, the steps of directing the flowing liquid to a first destination, establishing a temperature differential between a source of heat and the liquid being transported by the line to establish a temperature gradient in the liquid, detecting a change which is a function of said temperature gradient as indicative of the presence of a different liquid of the same temperature flowing in the pipe line, and when a change is detected, diverting the liquid flow to a different destination.

7. The method of claim 6 including, as the step of establishing a temperature gradient in the liquid, passing an electric current through an immersed element having a measurable temperature-resistance coefficient, and, as the step of detecting a change which is a function of the gradient, measuring the resistance of the element.

8. In a method of operating a pipe transmission line through which a plurality of different liquids of substantially the same temperature are transported serially to divert from the line at a point remote from the beginning thereof preselected liquids, the steps of selecting a length of the transmission line which is subjected to substantially the same ambient temperature conditions and which is preceded by a relatively larger length also subjected to the same ambient temperature conditions, establishing at both extremes of the selected length temperature differentials between sources of heat and the flowing liquid to establish temperature gradients in the liquid, comparing values which are functions of said gradients at both extremes when the same liquid is flowing throughout said length, detecting a change in the relative values which are functions of said gradients as indicative of the pressure of different liquids of the same temperature flowing at the same rate at the extremes, and diverting the liquid flow to a different destination.

9. The method of claim 8, including, as the steps of establishing temperature gradients at said extremes, passing an electric current through elements immersed at said extremes which have a measurable temperature-resistance coefficient, and, as the step of detecting a change in the values which are functions of the gradients, comparing the resistances of the elements.

References Cited in the file of this patent

UNITED STATES PATENTS

| | | |
|---|---|---|
| 1,388,613 | Simsohn | Aug. 23, 1921 |
| 1,881,543 | Hartig et al. | Oct. 11, 1932 |
| 2,165,569 | Obermaier | July 11, 1932 |
| 2,399,036 | Jones | Apr. 23, 1946 |
| 2,455,394 | Webber | Dec. 7, 1948 |
| 2,456,619 | Curry et al. | Dec. 21, 1948 |

U. S. DEPARTMENT OF COMMERCE
PATENT OFFICE

CERTIFICATE OF CORRECTION

Patent No. 2,828,479 March 25, 1958

Warren Jackson, Jr.

It is hereby certified that error appears in the printed specification of the above numbered patent requiring correction and that the said Letters Patent should read as corrected below.

Column 6, line 24, strike out "to provide a permanent and continuous record. As de-" and insert the same after "amplifier 60" in line 25, same column; column 8, line 75, for "pressure" read -- presence --.

Signed and sealed this 20th day of May 1958.

(SEAL)
Attest:
KARL H. AXLINE
Attesting Officer

ROBERT C. WATSON
Commissioner of Patents